United States Patent
Ngo et al.

(10) Patent No.: US 7,908,247 B2
(45) Date of Patent: Mar. 15, 2011

(54) STORAGE- AND TRANSPORT-INDEPENDENT COLLABORATIVE DOCUMENT-MANAGEMENT SYSTEM

(75) Inventors: J. Thomas Ngo, Draper, UT (US); J. Todd Webb, Alpine, UT (US)

(73) Assignee: Nextpage, Inc., Draper, UT (US)

( * ) Notice: Subject to any disclaimer, the term of this patent is extended or adjusted under 35 U.S.C. 154(b) by 1779 days.

(21) Appl. No.: 11/017,097

(22) Filed: Dec. 21, 2004

(65) Prior Publication Data

US 2006/0136511 A1 Jun. 22, 2006

(51) Int. Cl.
*G06F 17/30* (2006.01)
(52) U.S. Cl. .................. 707/638; 707/695; 707/784
(58) Field of Classification Search .................. 707/203, 707/638
See application file for complete search history.

(56) References Cited

U.S. PATENT DOCUMENTS

| | | | | |
|---|---|---|---|---|
| 5,649,200 A * | 7/1997 | Leblang et al. | ............... | 717/122 |
| 5,806,078 A * | 9/1998 | Hug et al. | ............... | 715/205 |
| 6,067,551 A * | 5/2000 | Brown et al. | ............... | 707/203 |
| 6,341,291 B1 | 1/2002 | Bentley et al. | | |
| 6,918,082 B1 * | 7/2005 | Gross et al. | ............... | 715/206 |
| 2002/0129045 A1 * | 9/2002 | Aoyama et al. | ............... | 707/203 |
| 2003/0050886 A1 * | 3/2003 | Cohen et al. | ............... | 705/37 |
| 2003/0145020 A1 * | 7/2003 | Ngo et al. | ............... | 707/201 |
| 2003/0200235 A1 * | 10/2003 | Choy et al. | ............... | 707/203 |
| 2006/0101092 A1 * | 5/2006 | Ishida et al. | ............... | 707/203 |

FOREIGN PATENT DOCUMENTS

EP 0 770 963 A3 2/1997

OTHER PUBLICATIONS

M. David Stone, Get Files Back Without the Merge Question, May 6, 2003, http://www.pcmag.com/article2/0,1759,1027570,00.asp.
Foldershare, File Transfer & Remote File Access, 2005, https://www.foldershare.com/info/aboutFoldershare.php?.
Gregory Shultz, Using Briefcase to Keep Files Synchronized, Aug. 2000, http://www.msdn.microsoft.com/library/default.asp?url=/library/enus/dnwinpro00/html/w9p0085.asp.
Shinkuro, Inc., Tools for Collaboration, http://www.shinkuro.com/products.php.
Groove Networks, Virtual Office File Sharing, http://www.groove.net/index.cfm/pagename/hp_filesharing/.

* cited by examiner

*Primary Examiner* — Hung T Vy
*Assistant Examiner* — Binh V Ho
(74) *Attorney, Agent, or Firm* — Buchanan, Ingersoll & Rooney, PC

(57) ABSTRACT

A document management system enables multiple users to collaboratively contribute to the contents of a document via any suitable medium for transporting and storing documents, including email, shared drives, replicated work spaces and centralized storage systems. A tracking strategy is employed, in lieu of a central repository, that is based upon medium-independent versioning. Each version of a document that is created and saved by a user is given a unique identifier. The versions are submitted to a global service for ratification as the next authoritative version of a document. A submitted version that forms the next step in a linear sequence is ratified as the authoritative version of the document, whereas the version which does not meet this criterion becomes identified as a new document. Support is provided for users who create versions off-line, as well as users who are not subscribers to the system.

17 Claims, 2 Drawing Sheets

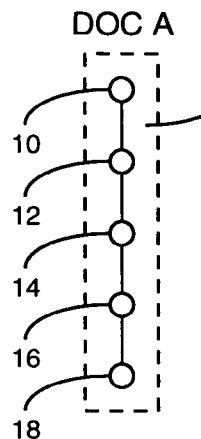
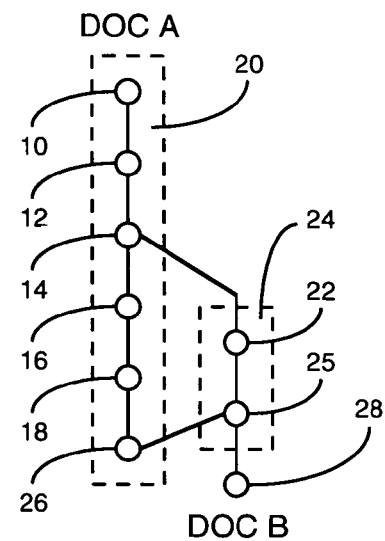
Fig. 1a　　　　　　Fig. 1b
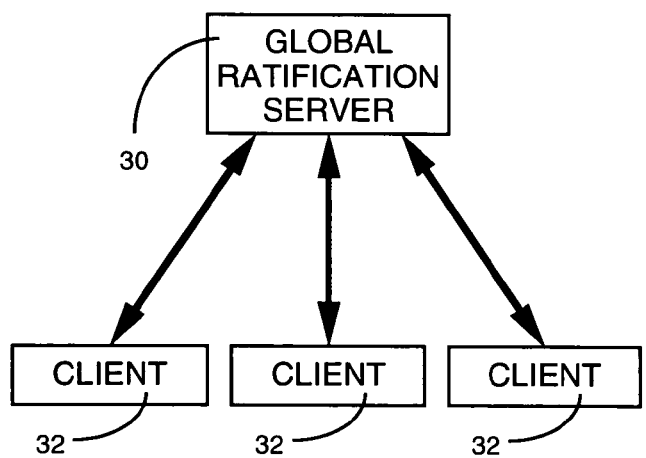
Fig. 2

STORAGE-AND TRANSPORT-INDEPENDENT COLLABORATIVE DOCUMENT-MANAGEMENT SYSTEM

FIELD OF THE INVENTION

The present invention is directed to document management systems that facilitate collaborative authoring of documents, and more particularly to a system that provides tracking and management of collaborative documents across any of a variety of different media that authors and other contributors may employ to share the documents among one another.

BACKGROUND OF THE INVENTION

The collaborative authoring of documents has become almost ubiquitous in the modern work place. However, when more than one person has input into the document generation process, difficulties can arise. A typical scenario might be as follows: A company employee completes a draft of a presentation, and emails it to a few co-workers for comments. The co-workers email their suggestions back to the original author, but also send the presentation on to others for additional input. In a relatively short period of time, a significant number of different versions of the presentation can end up being stored on the hard disk drives of computers throughout the company. Only one of these versions, however, is the authoritative one.

This result is only one of the many difficulties that can be encountered when the control over documentation is available to a variety of different people within an organization. Other examples of these difficulties include the possibility that an employee may invest a significant amount of time editing an important proposal, without the knowledge that he or she may not be working on the latest version of that proposal. In another case, a departing employee may return a laptop containing a large number of important documents and information, but it would be impractical to search through hundreds or thousands of files, many of which may be irrelevant, to find a few valuable items of information. As another example, a team of employees may need to take turns adding content to a new presentation, but if any one or more of them is unable to respond in a timely manner, bottlenecks will occur that can significantly extend the process.

In the past, these types of problems have been addressed to a limited extent by instituting a centralized system for document management. Generally, a central repository is established for important documents, such as a shared network drive, a web-based team room, or a formal document management system. This type of approach works well in settings where the work is structured, takes place primarily within company facilities, and does not involve people outside of the organization. Server-centric solutions of this type have been widely accepted in highly regulated areas, where meticulous record keeping is mandatory, such as in the pharmaceutical and legal professions.

Outside of these controlled settings, employees tend to work in less formal, unregulated ways. In a typical corporate setting, document authors may do their most pressing work outside of the mainstream of the corporate infrastructure. Typically, they may use their own hard disk drives to store important documents, and rely upon familiar tools, such as email, to share documents and route requests for edits and approvals. These informal approaches tend to be widely adopted because they conform to a user's typical work habits, and therefore do not present an inconvenience. However, they can result in inefficiency in the overall context of document management, resulting in the kinds of problems discussed previously.

The general objective of the present invention is to provide a user-focused approach to document management that accommodates the agile, mobile work habits of the modern environment, in a manner that complements and enhances the value of centralized storage and document management systems.

BRIEF DESCRIPTION OF THE DRAWING FIGURES

FIGS. 1a and 1b are tree diagrams depicting the relationships of documents and versions;

FIG. 2 is a general block diagram of the components of a document management system in accordance with one embodiment of the present invention;

DETAILED DESCRIPTION

Figure 3A:
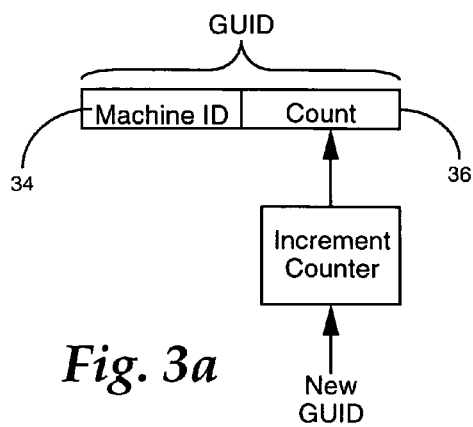
FIG. 3a is a schematic block diagram of the generation of a globally unique identifier.

Generally speaking, the present invention provides a document management system that facilitates collaboration among authors across any of a variety of different media that the authors may choose to store the documents and/or transfer them among one another, such as email, local hard disk drives, shared network drives, centralized document-management systems, replicated work spaces, and the like. To facilitate an understanding of the principles that are described hereinafter, a few basic terms will first be defined.

A "document" comprises any set of data that can be created and/or edited by a group of users, and stored in a tangible form. Examples of documents include an article created with a word processor, a slide presentation, a spreadsheet, a drawing created with a CAD or paint application, a software program, etc.

A document is comprised of one or more "versions", which have a linear sequential relationship to one another. Referring to FIG. 1a, a document is initially generated when a first version 10 of that document is created. Subsequently, the user may edit the original version and save the edits, thereby producing a second version 12 of the document. Each time a user edits the document and then saves those edits, another new version 14, 16, 18 of the document is created. In the example of FIG. 1a, the versions 10-18 form a linear sequence, i.e. each version (with the exception of the original version 10) is directly derived from the chronologically preceding version of the document. In the context of the present invention, the entire linear sequence constitutes a single document 20, which the user might recognize by a given name, e.g. DOC A. This document may be represented in each user's computer system by means of an icon. The most recent version of the document, version 18 in the example of FIG. 1a, typically represents the authoritative version of the document. Thus, when the user clicks on the icon representing the document, the most recent version is opened.

Conventionally, when a user edits a document and then saves the edits, the new version overwrites the previous version, unless the user manually performs an action to designate the saved edits as a new version. In accordance with the present invention, however, information pertaining to each of the prior versions 10-16 is persistently maintained, and separately identified. One example of the manner in which the information can be maintained is described in Published U.S. Application No. 2003/0145020 entitled "Data Replication Based Upon a Non-Destructive Data Model", the content of which is incorporated herein by reference.

In one embodiment of the invention, a new version is created every time the document is saved to any form of persistent storage. Thus, multiple versions can be created during a single user session of working on the document. This embodiment is desirable when the possibility exists that another user could begin concurrent editing of the document at any time. By establishing a new version with each save, consistency among different users' versions is more likely to occur in such a situation. In an alternative embodiment, a new version can be created only when the document is closed by the user performing the edits.

The linear sequence of versions 10-18 might all be made by a single user, or could be made by multiple users in succession. For example, User A may create and save the original version 10, and then email it to User B for review. User B can edit and save the document, which produces the second version 12, and then email this version to User C, whose edits would be saved as version 14. Eventually, the document may find its way back to the original User A, whose further edits are saved as the current version 18 of the document.

After a given version has been created and saved, e.g. version 14, it may be opened and edited by a user, which will result in the creation of the next version in the sequence, i.e., version 16. Referring to FIG. 1b, at the same time another user may open version 14, and concurrently make edits. If this latter edited version is saved subsequent to the saving of version 16, it cannot form part of the linear sequence that constitutes DOC A. In this case, this new version 22 is designated as the original version of a new document 24, e.g., DOC B. This new document is identified as a "related document" of DOC A.

The two related documents can be displayed together, e.g. side-by-side or in overlapping windows. At any point in time, content from DOC B can be merged into DOC A, thereby creating a new version 26 of DOC A. DOC B remains intact after the merger, whereupon the users can continue to treat it as desired, e.g., archive it, delete it, or continue to edit it to create a new version 28.

In the example of FIG. 1b, two different users are concurrently editing version 14 of DOC A. When the two users save their edited versions, only one of those versions can be designated as the next version to form the linear sequence that constitutes DOC A, and all other concurrently edited versions are designated as new documents. In the context of the present invention, the process by which a given version is designated as the next authoritative version of a particular document is known as "ratification". To provide comprehensive management of the documents, the ratification process is controlled by a global version-management service. Referring to FIG. 2, this global service is performed by a ratification server 30. Each of the users' computers 32 executes a client component of the version-management service that communicates with the global service on the ratification server 30. The client maintains a record of the document files that are in storage on the user's computer 32. This may include all storage media, or only a designated volume or folder. Preferably, the client registers with the computer's file system, to receive notification every time a file is written to any media within the file system. Each time such an event occurs, the client can add or update an entry in a table to record information pertinent to the file management process, as described hereinafter.

When a user is on-line, i.e., his or her computer 32 is in communication with the global ratification server 30, each time the user creates a new version, e.g., saves edits to the document, a request can be made to the global service to ratify that version as the next sequential version of the document. The ratification server stores a history of the ratified versions of a document, and determines whether the newly submitted version is a linear descendant of the latest ratified version of the document, i.e., there are no intervening versions from which the submitted version was not derived. If so, the new version is ratified and becomes the current, authoritative version of the document.

Each version of a document resides in a separate file. If the user chooses, all of the files for the different versions can remain on his or her computer. Alternatively, a user can elect to edit and save multiple versions without choosing a new filename. In such a case, the older versions are overwritten. If multiple versions remain in separate files, the user can indicate that older versions are to be archived, e.g. at a central storage facility, to conserve storage space on the user's computer. For instance, the user can indicate that when a new version is ratified, all prior versions are to be archived. Or the user might choose to keep the two or three most recent versions, and have any earlier versions archived.

If two users are concurrently editing a document, both may submit their saved edits for ratification. In this case, the global service 30 must determine which of the two competing versions is to be ratified as the next version of the document, and which will become a new document. Any suitable business logic can be employed to make this determination. As one example, a simple race criterion can be employed. In this case, the first new version to be submitted to the global service is ratified as the next authoritative version, and any other concurrently created versions become new documents.

To ensure that a document comprises a linear sequence of versions even if multiple users work on the different copies of a version concurrently, a document identifier is generated for each document. In addition, each version of the document has a version identifier.

The document identifier and the version identifiers are all globally unique identifiers. A globally unique identifier (GUID) can be generated according to any suitable algorithm for generating values that are guaranteed to be globally unique. FIG. 3a illustrates one example of a mechanism. In this mechanism, each machine is assigned a permanent machine ID, which itself is globally unique. A GUID generator forms a GUID by concatenating two values, the machine ID 34 stored in register and a counter value 36. It increments the counter value each time a new GUID is needed. Since the machine identifier is unique to the computer, and the counter value is increased each time a new version is created, the GUID is guaranteed to be unique across all machines in the document management system. This GUID can be used either as a document identifier or a version identifier.

Figure 3B:
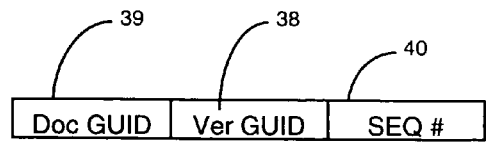
FIG. 3b illustrates a complete identifier string.

The complete identifier string for a version of a document is illustrated in FIG. 3b. As a user continues to edit and save a document, the client component of the version management service assigns a new version GUID 38 to each save. In addition, it assigns the combination of a document GUID 39 and a sequence number 40 to each save. The version GUID 38 is permanent and will always uniquely identify the save. The combination of document GUID 39 and sequence number 40 assigned by the client is provisional in nature until it is ratified by the global ratification server 30. Once the user goes back on-line, e.g., reconnects a laptop computer to the system network after being away on travel, the client submits the provisional assignment to the global ratification server. The ratification server will ratify the newly submitted assignment if it has not yet ratified the assignment of any other version to the same document and sequence number. If it already has made such an assignment, then it denies the request. Instead, it generates a new document identifier, and assigns the version identifier to that document with sequence number of 1.

When the user reconnects to the global service after working off-line, all of the unratified versions can be sent to the global service at once, in a batch mode. In a similar manner, multiple requests for ratification can be submitted in a batch mode while the user is working on-line, rather than as each version is generated, to reduce the number of sessions with the global service. Examples of different times when it may be appropriate to send a request, while on-line, can include (1) the first time the user saves the document after opening it, to communicate the fact that the user is working on the document, (2) when the document is closed, and (3) when the document is sent to another user or otherwise posted for sharing by others, since this marks a point at which other potentially competing versions might begin to be created.

The client component of the version management service can start a new document on its own. For example, after editing a document while working off-line, the user may choose to save it by using a "Save As" command, and clear its version history. In this case, the client component can generate a new document identifier and sequence number.

Accommodating unratified, or provisional, assignments provides support for off-line users, and ensures version linearity as long as users' edits are sequential, even when they do not have access to the global ratification service. Ratification can be performed asynchronously, so that operations do not have to wait for communication with the global service.

The version identifier travels with the file containing the associated version of the document, as it is transmitted from one user to another or saved on different media. In one embodiment of the invention, the version identifier is embedded directly into the document file, as metadata. For example, certain types of files support the ability to embed metadata by means of stamping. Examples of these types of files include those associated with the Microsoft Office® suite of applications. As an alternative to incorporating the metadata directly into a file, such as by means of stamping, it is also possible to store the metadata in a separate file that travels with, and remains associated with, the document content file. As a further variant, some types of computer operating systems support a separate data stream that remains permanently associated with a file. In these types of systems, the metadata containing the version identifier can be stored within such a data stream.

Figure 4:
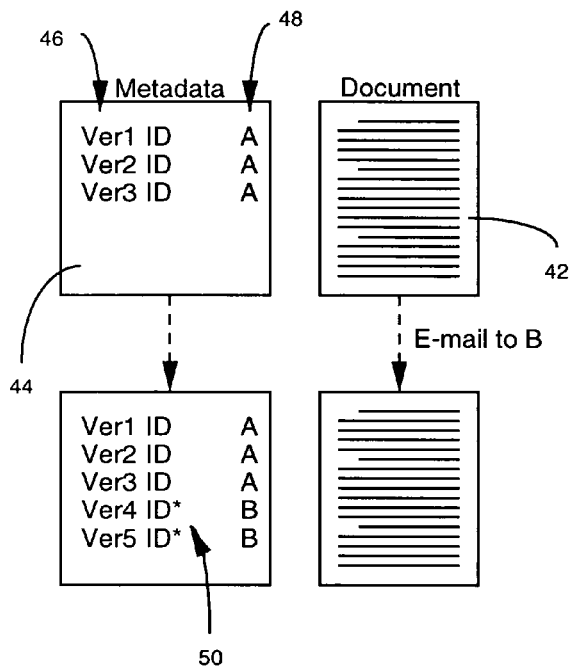
FIG. 4 is a block diagram illustrating examples of metadata associated with a document file.

In addition to the version identifier, other items of information can be included in the metadata that accompanies the file containing a version of the document. One such item of other information is the identification of the author who contributed to a particular version. FIG. 4 illustrates an example of a document 42 that was initially created by User A. After the first version was created, User A edited and saved the document two times, thereby resulting in three versions. The metadata 44 associated with the document includes a version identifier 46 and a contributor identifier 48, in this case User A, for each version. If privacy of users is a consideration, the contributor identifier can be made opaque, i.e. the metadata associated with the file does not directly identify the user, but comprises a reference from which the user identity can be determined by authorized persons.

For purposes of this example, it is assumed that User A was working on-line, and therefore each version has been ratified. After saving the third version, User A emails the file containing the third version of the document to User B, who then makes a series of edits to the document. Each time the edits are saved, a new version is created, and another set of entries 50 are added to the metadata. In the example of FIG. 4, User B has generated two versions of the document. Assuming that User B was working off-line while these two versions were created, the assignments of their version identifiers to combinations of document identifier and sequence number are provisional, since they have not yet been ratified. The provisional nature of the assignments is indicated with an asterisk in the example of FIG. 4.

In some situations, it may be helpful to display the identity of the user who contributed to a version of a document being edited. For instance, as noted previously, two documents might be displayed in a side-by-side manner to enable content from one to be merged into another. If different users have different respective levels of priority, the identification of the contributors will enable the person performing the merge operation to easily select the version from the user having the higher level of priority.

The metadata associated with a file presents an individual version history that enables the client component of the version management service to relate the version associated with that file to other versions that are already resident on the user's computer. Thus, for example, if User A had originally emailed version 1 of the document to User B, and then subsequently emailed version 3, upon receipt of version 3 the client component on User B's computer immediately recognizes the relationship of version 3 to the copy of version 1 stored on that computer.

One of the attributes that can be associated with a document is a "replace on receive" capability that can be selectively set for each document by the individual users. In the preceding example, if User B has activated this feature for the document, as soon as the client component recognizes that version 3 is a linear descendant of version 1, it can automatically replace version 1 with version 3. Such replacement might involve, for example, changing a pointer for the icon associated with the document to point to version 3 rather than version 1. This operation can be constrained to occur only if the newer version is a ratified version, so that an older version on the user's computer does not inadvertently get replaced by a version that could end up becoming a new document.

The client component of the version management service constitutes a local cache of all information that the client learns from files stored on the user's computer and from the global service. In addition to the individual version history, the client maintains a combined version history that comprises the sequence number of the last ratified version of a document, which it obtains from the global service, and the union of all individual version histories that can be obtained from files stored on the user's computer. Referring again to the example of FIG. 4, after User B creates and saves version 5 of the document, he may email it back to User A. At this point, User A's computer has copies of versions 1-3 and 5. From these versions, the client on User A's computer creates a combined version history that identifies the sequence of versions 1-5. This version history can include both ratified and unratified versions.

In one embodiment of the invention, when the client communicates with the global service, it retrieves and stores all ratified version identifiers for a document, rather than just the most recent. By distributing the ratified version information among the users' computers in this manner, recovery from a data loss at the global ratification server can be accomplished more easily.

Prior to returning the document to User A, User B may have gone on-line to ratify versions 4 and 5. When User B subsequently sends version 5 to User A, it will be designated as a ratified version. However, during the creation of the combined version history, the client at User A's computer does not directly trust the version ratification that it discovers from the file received from User B. Rather, upon discovering a ratification that has not been previously encountered, the client checks with the global service before committing the ratification to its cache. If contact with the global service is not possible, the version is recorded as being unratified.

By limiting the combined version history stored on a given user's computer to the information that can be obtained from files on that computer, plus the number of the latest ratified version, users' privacy expectations are fulfilled. For example, when a user chooses to send a document via email, he has expectations regarding the people who will, and will not, receive a copy. The information stored in the combined version history remains consistent with this expectation.

Figure 5:
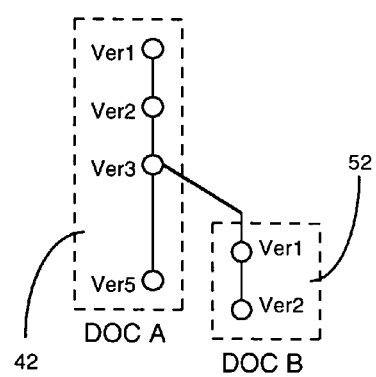
FIG. 5 is an example of a document history display.

Another feature that is provided by the client on the user's computer is the ability to display a document history. The document history is a display that shows a subset of the document's versions and their relationships. The versions that are displayed in the history comprise those that the user has physical access to in file storage. FIG. 5 illustrates an example of a document history that might be displayed on the computer of User A, for the example described previously in connection with FIG. 4. Since User A created each of versions 1, 2 and 3 of the document 42, those versions are available to User A, e.g., they are stored on the user's local hard disk drive or on an accessible network drive. Version 5 of the document was mailed from User B to User A, and is therefore also accessible at User A's computer. However, since version 4 was not sent to User A, and remains only on User B's computer, it does not appear in the document history display for User A.

In addition to showing the versions of a given document that are accessible to the user, the document history display can also depict any related documents that are likewise accessible to the user. For example, while User B was editing and creating versions 4 and 5 of the original document 42, User A may have made a copy of version 3 and begun creating a new document 52. The versions of this new document created by User A also appear on the document history display.

If User A subsequently sends the new document 52 to User B, the client at User B's computer will recognize it as a related document of document 42. In this case, it can search the version histories of both documents to find a common ancestor, in this case version 3 of document 42. The document history display can then indicate the relationship of the two documents, relative to their common ancestor.

A document history is also stored at the global ratification server 30. Unlike the individual version histories stored on the various user computers 32, however, the document history stored on the server 30 does not include provisional assignments. Rather, only those assignments that have been ratified are stored in the server 30. By definition, the ratified version identifiers assigned to a document identifier form a linear sequence. In response to a query from a user computer 32, the global ratification server 30 can return an identification of a given document's last ratified version, and the user who contributed to it.

Another item of information that can be incorporated in the metadata is a contributor relationship that indicates the version identifiers of a contributing version and a receiving version of a document. One mechanism by which a contributor relationship can arise is the merging of content from one document into another. For example, as illustrated in FIG. 1*b*, content from version 25 of DOC B is merged into version 26 of DOC A. When this occurs, the metadata associated with version 26, and all subsequent versions of DOC A, identifies version 25 of DOC B as the contributing version, and version 26 of DOC A as the receiving version.

Another way to create a contributor relationship is to start a new document from an existing document. For example, as noted previously, a user could open a file containing version 4 of a document when a version 5 already exists, then edit and save it. Since the resulting version cannot be ratified as version 5 of the same document, it is instead made version 1 of a new document. The metadata stored with the file will identify version 4 of the previously existing document as the contributor, and the first version of the new document as the receiver.

In many situations, it is not easily possible to avoid having multiple users do concurrent work on a document. However, where possible, it is preferable to take turns editing a document, to avoid conflicting edits or complicated merges. The global version management service of the present invention provides various levels of support to enable users to become aware of one another's work in real time. As noted previously, the client component of the version management service can query the global service to obtain the identification of the latest ratified version of a document. Upon obtaining this information, the client can compare it to the latest version stored on the user's computer, and alert the user if he does not have the latest version. This alert might be displayed, for example, when the user first opens the document. In response to this alert, the user can obtain the most recent version. For instance, the ratification server 30 might store a copy of that version, or a link to where it is stored. Alternatively, since the identification of the most recent version includes information pertaining to the author who contributed to it, the user can contact the contributor directly to obtain a copy. To support this type of document awareness, the client can regularly poll the global service to identify the latest ratified version of a document.

In a further aspect of this functionality, an on-line user can be alerted when another on-line user has the latest version of a document open. This alerts the users to the fact that the next version might already be under creation, so that they can avoid creating a non-sequential version that might end up becoming a new document. Again, this type of document awareness can be supported by periodic communication between the clients and the global management service.

As a further extension of this functionality, the version management service may enable users to explicitly declare that they intend to edit a version of a document. Such a declaration can be mutually exclusive, to enable one person at a time to control the document. This declaration is published to other on-line users, so that when they see it, they can defer editing the document until the declaration has been removed. Further in this regard, the users can enter their names in a queue for the right to create the next version after all prior declarants have completed their edits.

Thus far, the version management system of the present invention has been described in connection with users who have the client component of the service running on their individual computers 32. It is possible that a document may be created and/or edited by a user who does not have the client component of the service, i.e., a non-subscriber. When the non-subscriber saves an edited version of a document, a unique version identifier will not be generated and attached to the file containing the document. However, the system of the present invention provides support for this situation. Generally speaking, this support is provided by generating an identifier when the file is first encountered by a computer on which the version management service is executing, either the global server 30 or a client computer 32. This process is carried out in one of two ways, in dependence upon whether the document had been previously stamped with document and version identifiers, or whether it is a new document generated by the non-subscriber, and therefore contains no identifiers.

If a file that had been previously assigned a version identifier is received from a non-subscriber, the version management service automatically generates a new identifier for the version received from the non-subscriber. This identifier conforms to two requirements. First, when two different instances of the version management service, e.g., two separate client computers 32, encounter the same version from a non-subscriber, they should generate the same version identifier. Second, when the version management service encounters two different versions from non-subscribers, it should generate two different version identifiers. To support these requirements, a version identifier is computed on behalf of the non-subscriber by utilizing information that is unique to the saved version received from the non-subscriber. One example of such is to compute a hash of the last version identifier assigned to the file, with data unique to the newly received version. One example of this data is the contents of the file. Other choices for the hash data can be made, in dependence upon the type of file.

When a file is received from a non-subscriber that does not contain any previous document and version identifiers, e.g., the file is not stamped with metadata relating to version management, a manual approach is employed for the assignment of the identifiers. Specifically, the receiving user can selectively decide whether to adopt the received file as a new document, or as the next version of an existing document. For instance, a non-subscriber may own a document, and regularly publish it to one or more subscribers. The subscribers can use the version management service to maintain a consistent record of the versions received from the non-subscriber. Each time a new revision is received from the non-subscriber, the receiving subscriber can adopt it as the next version of the document.

In a second scenario, the non-subscriber may own the document, but seeks regular review from a subscriber. As in the previous scenario, each time a new version is received from the non-subscriber, it is saved in sequence. In addition, whenever the subscriber edits and saves the document, the subscriber's work is interleaved with the versions received from the non-subscriber. As long as these edited versions remain only on the subscriber's computer, the version relationships will remain intact.

As a third example, a number of users, at least one of whom is a non-subscriber, take turns editing the document. The first time a subscriber edits the document, it is assigned a version identifier. Thereafter, the subscribers can easily coordinate taking turns with one another, and maintaining version consistency. However, they are unaware of the activities of the non-subscriber. When a subscriber receives and edits a version from the non-subscriber, it can be adopted as the next version of the document. To avoid creating multiple documents, it is preferable to designate only one of the subscribers as the person who is authorized to adopt versions from the non-subscriber as the next version of the document.

In the preceding examples, any user has the ability to create a new, authoritative version of a document. If desired, this capability can be restricted to a defined set of users by means of edit keys that are included within the metadata attached to a document. In one implementation of this concept, every copy of a version has an embedded edit-key list. If the edit-key list is empty, it indicates that any user can create the next version of the document, by editing that copy and saving the result. However, if the list contains at least one entry, then the users who can create an authoritative version of the document is limited to those who are identified in the list. If a user who is not on the edit-key list edits and saves a copy of the document, that copy automatically becomes a new document. The edit-key restrictions are enforced by the client component of the version management service.

If desired, the edit keys can be made specific to a version of a document. As a result, a user having an edit key for one version does not automatically have edit keys for any subsequent versions. Further in this regard, the edit keys can be made specific to a particular copy of a version, so that changes to the edit-key list in one copy does not affect other copies.

From the foregoing, therefore, it can be seen that the present invention provides a user-focused document management system that facilitates the transmission and storage of collaboratively authored documents via any medium with which users have familiarity, and thereby removes the constraints associated with server-centric systems. As a result, there is a higher probability that all users will become willing subscribers to the system. The global service complements centralized legacy systems, while providing support for off-line users through distributed version management and tracking. Furthermore, the system readily supports those situations in which non-subscribers contribute to a collaborative document.

While the invention has been described with reference to exemplary embodiments, it will be appreciated that the principles that underlie the invention can be embodied in other specific forms, without departing from the spirit or essential characteristics thereof. For instance, while email has been described as the mechanism via which users share documents with one another, any other medium can be employed with the same effect. Instead of emailing documents, for example, authors can post them to a common workspace or a shared folder on a network drive, where they can be retrieved and edited via other users.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A system for managing documents, comprising:
   a client service that executes on a user's computer, which assigns a unique version identifier to a version of a document; and
   a ratification server which executes a global service that communicates with the client service to receive the version identifier and the document, and if the version of the document is a linear descendant of a latest ratified version of the document, ratifies the version of the document identified by its associated unique version identifier as a new authoritative version of the document, and if the version of the document is not a linear descendant of the latest ratified version of the document, saves the version of the document identified by its associated unique version identifier as a version of a new document that is related to the document;
   wherein each of the unique version identifiers is globally unique in the system;
   wherein the global service determines whether the author of a version has a right to control the document, and does not ratify a version as a new authoritative version of the document if the author of the version lacks control of the document; and wherein the global service determines whether the author of a version has a right to control the document by detecting whether the author of a version is named on a list of authors who have control of the document.

2. The system of claim 1, wherein said client service stores the identity of the user in connection with the version identifier.

3. The system of claim 2, wherein the global service stores the identity of the user who created the authoritative version, and provides said identity to client services in communication therewith.

4. The system of claim 1, wherein said client service examines a document received at the user's computer to determine whether it contains a version identifier, and automatically assigns a version identifier if it does not contain one.

5. The system of claim 1, wherein said client service examines a document received at the user's computer to determine whether it is a more recent authoritative version of a document stored on the user's computer, and automatically replaces the version of the document on the user's computer with the received version if the received version is a more recent authoritative version.

6. The system of claim 1, wherein said client service assigns said version identifier regardless of whether it is in communication with said global service.

7. The system of claim 1 wherein said global service communicates the identification of the current authoritative version of the document to the client service, and the client service displays a notice if the user edits a version other than the current authoritative version of the document.

8. The system of claim 1 wherein said global service provides a notification to each client service that is in communication with the global service when a user is editing the authoritative version of a document, and the client services display notices to inform their respective users that another user is editing the current authoritative version of the document.

9. The system of claim 1, wherein documents are furnished to the user's computer by means of any one or more of a shared drive, a document management system, an electronic mail message, or a local storage medium.

10. The system of claim 1, wherein the assigned version identifier is stored as metadata in a file containing its associated version of the document.

11. The system of claim 1, wherein said global service executes on a server that is accessible via a public network.

12. The system of claim 1, wherein said global service receives version identifiers from a plurality of client services, and ratifies the first received version that is a linear descendant from the current authoritative version as the new authoritative version.

13. The system of claim 1, wherein said global service stores an identification of the location of the current authoritative version of the document, and wherein a copy of the document on a user's computer includes a hyperlink that retrieves the current version of the document from the stored location.

14. The system of claim 1, wherein the user's computer which executes the client service assigns the unique version identifier to the version of the document when the user saves the document.

15. The system of claim 1, wherein each of ratified versions of the documents resides in a separate file.

16. A system for managing documents, comprising:
a user's computer which executes a client service that assigns respective unique version identifiers to a plurality of versions of a document, and maintains a local history of the plurality of versions of the document; and
a ratification server which executes a global service that communicates with the client service to receive the version identifiers, the plurality of versions of the document and the local history, and maintains a history of ratified versions of the document;
wherein each of the unique version identifiers is globally unique in the system;
wherein the ratification server selectively ratifies the received versions identified by their respective unique version identifiers based on the local history and the history of ratified versions of the document;
wherein the global service determines whether an author of a version has a right to control the document, and does not ratify a version as a new authoritative version of the document if the author of the version lacks control of the document; and
wherein the global service determines whether the author of a version has a right to control the document by detecting whether the author of a version is named on a list of authors who have control of the document.

17. The system of claim 16, wherein each version of a document resides in a separate file in the user's computer, and each version of a document resides in a separate file in the ratification server.

* * * * *